March 28, 1961 E. F. LEWELLEN ET AL 2,976,739
ADJUSTABLE PULLEY
Filed July 1, 1959
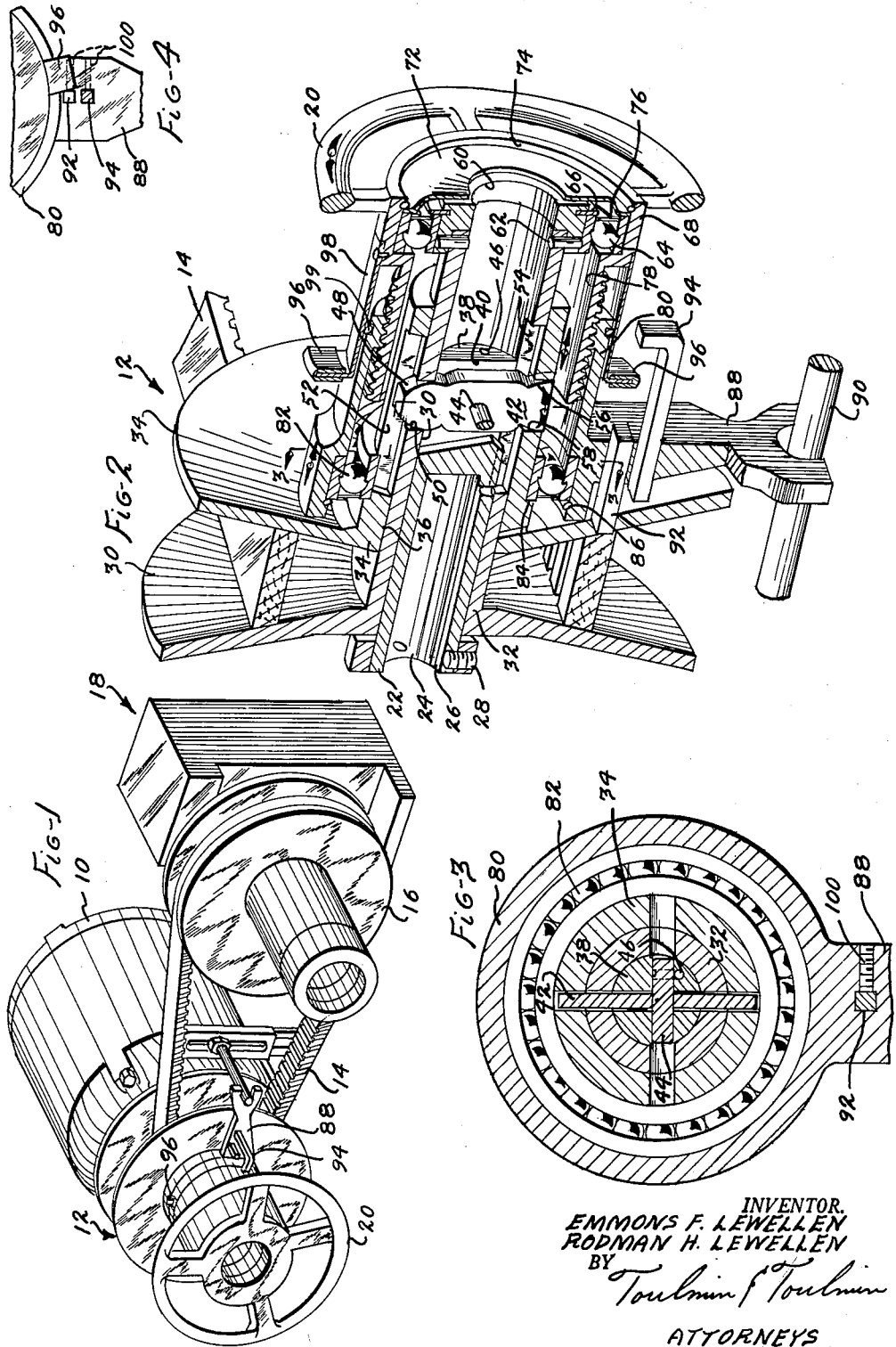
INVENTOR.
EMMONS F. LEWELLEN
RODMAN H. LEWELLEN
BY
ATTORNEYS United States Patent Office 2,976,739
Patented Mar. 28, 1961

2,976,739
ADJUSTABLE PULLEY
Emmons F. Lewellen and Rodman H. Lewellen, both % The Lewellen Manufacturing Company, Columbus, Ind.

Filed July 1, 1959, Ser. No. 824,257
9 Claims. (Cl. 74—230.17)

This invention relates to pulleys, particularly to V belt pulleys, and most especially to adjustable V belt pulleys.

V belt pulleys are employed for drivingly interconnecting shafts and among the different types of V belt pulleys are adjustable and variable pulleys. It is in particular connection with adjustable pulleys that the present invention is concerned.

An adjustable pulley of the nature of which this invention is concerned consists, basically, of a pair of cone discs which are adjustable toward and away from each other in order to vary the pitch of the pulley. When such a pulley is connected with a variable pulley by a V belt, a wide range of speeds between the shafts so interconnected can be obtained. A variable pulley, as referred to above, is a pulley in which the cone discs are spring urged toward each other so that they will move to compensate for adjustments of the adjustable pulley and which latter adjustments are accomplished manually.

A particular object of the present invention, accordingly, is the provision of a greatly improved adjustable pulley structure.

It is also an object of this invention to provide an adjustable pulley structure in which adjustment of the pitch of the pulley can be accomplished while the pulley is running, and under load.

A still further object of this invention is the provision of an infinitely adjustable pulley in which the pitch diameter of the pulley can be adjusted while the pulley is in operation but in which the driving belt will remain in a single plane.

A still further object of this invention is the provision of an adjustable pitch pulley which can be adjusted while the pulley is running, and under load, and which pulley will not impose any end thrusts on the shaft on which it is mounted.

A still further object of this invention is a provision of an adjustable pitch pulley which can be adjusted while the pulley is in operation.

Still another object of this invention is the provision of an adjustable pitch pulley in which all of the adjustable parts of the pulley structure are enclosed and thus protected from dust and other foreign matter.

It is also an object of this invention to provide an adjustable pitch pulley which can be manually adjusted while the pulley is operating, and under load and wherein the adjustment will be maintained and will not tend to drift as the pulley operates.

The foregoing objects as well as other objects and advantages of this invention will become more apparent upon reference to the following specification taken in connection with the accompanying drawings in which:

Figure 1 is a perspective view showing, diagrammatically, an adjustable pulley according to the present invention connecting a drive motor with a machine to be driven by the motor;

Figure 2 is a perspective sectional view showing details of construction of an adjustable pulley according to the present invention;

Figure 3 is a fragmentary sectional view showing an adjusting lever forming a part of the adjustable pulley structure; and Figure 4 is a fragmentary view showing the manner in which the adjustable stops cooperate with the adjusting mechanism to determine the limits of adjustment of the adjustable pulley.

Referring to the drawings more in detail, in Figure 1 there is an electric drive motor 10, on the output shaft of which is mounted an adjustable pulley 12 according to this invention. A V belt 14 connects adjustable pulley 12 with a variable pulley 16 mounted on the input shaft of a machine generally indicated at 18.

The adjustable pulley 12 is adjustable in pitch by means of the hand wheel 20 pertaining thereto and the variable pulley has its two cone discs spring urged toward each other so that as the adjustable pulley is adjusted the pitch of the variable pulley will automatically adjust in order to maintain the belt 14 in driving relation with both pulleys.

The structure of the adjustable pulley of the present invention is more fully illustrated in Figures 2, 3, and 4 where it will be seen that the pulley comprises a central sleeve 22 bored as at 24 by receiving the drive shaft on which it is to be mounted. Bore 24 has therein a keyway 26 to receive a key for locking the sleeve to the shaft and set screws 28 may be provided to retain the sleeve on the shaft.

The pulley proper comprises a first cone disc 30 having a hub 32 which is slideably mounted on sleeve 22. A second cone disc 34 is also provided which has a hub 36 which is slideably mounted on hub 32 of the first cone disc.

The aforementioned sleeve 22 terminates inside hub 32 in a slotted solid end part 38 within the slot 40 of which there is mounted a lever 42 on a pin 44. Pin 44 is retained in the solid end 38 of the sleeve as by a screw 46 which will be seen in Figure 3.

The lever 42 at its upper end has a cam shaped end part 48 fitting within a short slot 50 in hub 32 of cone disc 30. This end part of the lever also extends into an elongated slot 52 formed in hub 36 of cone disc 34.

At its opposite end lever 42 extends through an elongated slot 54 in hub 32 of cone disc 30 and has a cam shaped end part 56 fitting in a short slot 58 formed in hub portion 36 of cone disc 34.

It will be evident that the lever 42 provides for simultaneous movement of the cone discs 30 and 34 toward and away from each other on sleeve 22 without changing the center plane in which the belt engaging the cone discs will run. Thus, if sleeve 22 is fixed to a shaft, movement of the cone discs 30 and 34 toward and away from each other will not change the plane in which belt 14 is running and will, therefore, not impose any loads on the supporting bearings of the shaft.

The equal and opposite movements of the cone discs is obtained by mounting the pivot pin 44 for lever 42 on an axis midway between the cam ends 48 and 56 of the lever. This will be seen in Figure 3 wherein it will be observed that pin 44 is in a hole located to one side of the center of sleeve 22.

According to this invention there is mounted on the outer end of hub 32 of cone disc 30, an adapter ring 60, retained in place on the end of the hub as by pins 62. This adapter ring supports the inner race of an anti-friction bearing 64 which is retained in place on the adapter ring by snap ring 66. The outer race of the anti-friction bearing is positioned in a recess in the outer end of a housing member 68 which has integrally formed therewith the hand wheel 20. A dust cover 72 encloses the bearing 64 and is retained in place by a snap ring or wire 74. In addition, the anti-friction bearing 64 preferably has an integral dust seal 76 between its races at the outer side.

The housing member 68 has an inwardly extending cylindrical part 78 which is externally threaded. This externally threaded part of housing 68 is engaged by an internally threaded part of a second housing member 80 which extends inwardly to adjacent cone disc 34 and supports the outer race of an anti-friction bearing 82, the inner race of which is mounted against a shoulder 84 formed on hub 36 pertaining to cone disc 34. A snap ring 86 fixes the outer race of anti-friction bearing 82 to the housing member 80.

Housing member 80 is formed with an arm 88 terminating in a fork portion that engages a stationary rod 90 so that the housing member is prevented from rotating as the pulley rotates. The arm is also availed of for supporting the stop members 92 and 94 which are operable for limiting the adjustability of the pulley.

The stop members cooperate with one or more tabs 96 formed on the outside of a dust sleeve 98 which is attached to housing member 68. O ring 99 seals between the sleeve 98 and housing 80 so the adjusting mechanism for the pulley is entirely enclosed.

It will be evident that the housing members 80 and 68 will remain stationary as the pulley rotates. However, it will also be evident that rotation of housing member 68 by the hand wheel 20 will cause the housing members to telescope to a greater or lesser amount and that simultaneously the cone discs 30 and 34 will be adjusted relative to each other to change the pitch of the pulley. It will also be evident that, on account of lever 42 and its engagement with the hubs of the cone discs, the cone discs will take equal and opposite movements whereby belt 14 will always run in the same vertical plane passing midway between the cone discs.

A feature of the present invention is that the thrusts on the cone discs will be carried by the anti-friction bearings which support the housing members on the hubs of the cone discs so that no thrusts are transmitted from the cone discs to the sleeve 22 and the shaft to which it is attached for any position of adjustment of the cone discs.

It will be noted that as the housing members move toward or way from each other as the hand wheel 20 is rotated, the tabs 96 of dust sleeve 98 will come to a position where they will abut either one or the other of the stop members 92, 94 whereby the limits of adjustment of the pulley can readily be adjusted merely by adjusting the said stop members. Adjustment of the said stop members can be accomplished by availing of the screws 100 by means of which the stop members are adjustably retained in arm 88 pertaining to housing member 80.

For servicing the adjustable pulley described above, or at the time of installation, the snap ring 74, dust seal 72 and snap ring 66 can be removed, stop member 94 is then either adjusted to ineffective position or is completely removed, and the housing member 68 can then be unthreaded and taken out together with bearing 64. This will expose the inside of the adjustable pulley for any servicing or adjustment that may be necessary and it will be evident that the pulley can be further disassembled if so desired.

Both of the housing members 68 and 80 can be removed at one time without disturbing the aforementioned stops, by removing snap ring 74 and dust seal 72 and then removing snap ring 66, whereupon the entire assembly can be removed as a unit. Complete disassembly of the unit can then be effected by loosening the set screw 46 and removing pin 44 which will release lever 42 so that it can be removed, thus releasing the hubs of the cone discs from each other.

We claim:

1. In an adjustable pitch pulley; a sleeve member adapted for being attached to a shaft, a first cone disc mounted on said sleeve member, a second cone disc mounted on the first cone disc, means on the sleeve member engaging the cone discs to cause equal and opposite movement thereof relative to the plane of a belt drivingly engaging the pulley when the cone discs are adjusted to vary the pitch of the pulley, housing members journalled on said cone discs, means holding one housing member against rotation, and means connecting the housing members for infinite adjustability relative to each other axially for varying the pitch of the pulley.

2. In an adjustable pitch pulley; a sleeve member adapted for being attached to a shaft, a first cone disc mounted on said sleeve member, a second cone disc mounted on the first cone disc, means on the sleeve member engaging the cone discs to cause equal and opposite movement thereof relative to the plane of a belt drivingly engaging the pulley when the cone discs are adjusted to vary the pitch of the pulley, housing members journalled on said cone discs, said housing members being screw threadedly interconnected, means to hold one housing member against rotation, and means for rotatingly adjusting the other housing member to vary the pitch of the pulley.

3. In an adjustable pitch pulley; a sleeve member adapted for being attached to a shaft, a first cone disc mounted on said sleeve member, a second cone disc mounted on the first cone disc, means on the sleeve member engaging the cone discs to cause equal and opposite movement thereof relative to the plane of a belt drivingly engaging the pulley when the cone discs are adjusted to vary the pitch of the pulley, a housing member for each cone disc, a bearing journalling each housing on its pertaining cone disc operable to transmit axial loads therebetween, said housing members being in telescopic screw threaded interengagement, means holding one of the housing members against rotation, and manual means for rotatively adjusting the other of the housing member.

4. In an adjustable pitch pulley; a sleeve member adapted for being attached to a shaft, a first cone disc on the sleeve member, a second cone disc on the first said disc, means on the sleeve mmeber engaging the cone discs to cause equal and opposite movement thereof relative to the plane of a belt drivingly engaging the pulley when the cone discs are adjusted to vary the pitch of the pulley, a housing member for each cone disc, a bearing journalling each housing on its pertaining cone disc operable to transmit axial loads therebetween, said housing members being in telescopic screw threaded interengagement, means holding one of the housing members against rotation, manual means for rotatively adjusting the other of the housing members, and means adjustable for predetermining the limits of rotative adjustment of said other housing member.

5. In an infinitely adjustable pulley; a sleeve member adapted for connection with a shaft, a first cone disc having a tub slidable on the sleeve member, a second cone disc having a hub slidable on the hub of the first cone disc, a lever pivoted on said sleeve and having its opposite ends engaging different ones of said hubs whereby the cone discs take respectively opposite directions of movement on the sleeve member when adjusted to change the pitch of the pulley, a housing member for each cone disc, an axial thrust transmitting anti-friction bearing supporting each housing member on its pertaining cone disc, said housing members being in telescopic screw threaded engagement, means holding one of said housing members against rotation, and a handwheel on the other housing member for infinite rotative adjustment thereof.

6. In an infinitely adjustable pulley; a sleeve member adapted for connection with a shaft, a first cone disc having a hub slidable on the sleeve member, a second cone disc having a hub slidable on the hub of the first cone disc, a lever pivoted on said sleeve and having its opposite ends engaging different ones of said hubs whereby the cone discs take respectively opposite directions of movement on the sleeve member when adjusted to change the pitch of the pulley, a housing member for each cone disc, an axial thrust transmitting anti-friction bearing supporting each housing member on its pertaining cone disc, said housing members being in telescopic screw threaded engagement, means holding one of said housing members against rotation, a handwheel on the other housing member for infinite rotative adjustment thereof, and cooperating elements of adjustable stop means on said housing members to limit the relative rotation thereof and thus to limit the range of adjustment of the pulley.

7. In an infinitely adjustable pulley; a sleeve member adapted for connection with a shaft, a first cone disc having a hub slidable on the sleeve member, a second cone disc having a hub slidable on the hub of the first cone disc, a lever pivoted on said sleeve and having its opposite ends engaging different ones of said hubs whereby the cone discs take respectively opposite directions of movement on the sleeve member when adjusted to change the pitch of the pulley, a housing member for each cone disc, an axial thrust transmitting anti-friction bearing supporting each housing member on its pertaining cone disc, said housing members being in telescopic screw threaded engagement, means holding one of said housing members against rotation, a handwheel on the other housing member for infinite rotative adjustment thereof, a dust sleeve carried by one of the housing members sealingly but movably engaging the other of the housing members, said dust sleeve having stop tab means, and abutment means for engagement by the stop tab means adjustably mounted on the housing member movably engaged by the dust sleeve.

8. In an infinitely adjustable pulley; a sleeve member adapted for connection with a shaft, a first cone disc having a cylindrical hub slidably mounted on the sleeve member, a second cone disc having a cylindrical hub slidably mounted on the hub of the first cone disc, each hub having an aperture in one side and an elongated slot diametrically opposite the aperture on the other side, a lever having cam ends fitting into the said apertures and said lever also extending into the said slots, means pivotally supporting the lever on the sleeve member on an axis midway between said apertures so the sleeve member and cone discs are held against relative rotation while the cone discs when adjusted axially on the sleeve member will take equal and opposite movements relative to a central plane therebetween, a housing member for each cone disc, axial thrust transmitting anti-friction bearings supporting each housing member on the hub of its pertaining cone disc, said housing member telescoping and being screw threadedly interconnected, one housing member being held against rotation, and means for manually rotatively adjusting the other housing member.

9. In an adjustable pitch pulley; a support member, a pair of cone discs operatively slidable on the support member, a housing member pertaining to each cone disc journalled on its respective cone disc but held against axial movement relative to its pertaining said disc, means holding at least one of said housing members against rotation as the pulley and, therefore, the cone discs rotate, means carried by the support member engaging said discs to cause equal and opposite movement of the discs on the support member, and means connecting said housing members operable for adjusting said housing members axially relative to each other to adjust the cone discs toward and away from each other to adjust the pitch of the pulley.

References Cited in the file of this patent

UNITED STATES PATENTS

| | | |
|---|---|---|
| 2,640,365 | Michie | June 2, 1953 |
| 2,751,790 | Ingold | June 26, 1956 |
| 2,852,951 | Miner | Sept. 23, 1958 |

Disclaimer 2,976,739.—*Emmons F. Lewellen* and *Rodman H. Lewellen*, Columbus, Ind. ADJUSTABLE PULLEY. Patent dated Mar. 28, 1961. Disclaimer filed May 28, 1962, by the inventors.
Hereby enter this disclaimer to claims 1, 2, 3, 4, 5, 8 and 9 of said patent.
[*Official Gazette June 26, 1962.*]